(12) United States Patent
Yun et al.

(10) Patent No.: US 11,489,228 B2
(45) Date of Patent: Nov. 1, 2022

(54) COMPONENT FOR MEASURING PRESSURE CHANGE IN POUCH-TYPE BATTERY, AND METHOD FOR MEASURING PRESSURE CHANGE IN POUCH-TYPE BATTERY BY USING SAME

(71) Applicant: LG Chem, Ltd., Seoul (KR)

(72) Inventors: Heesun Yun, Daejeon (KR); Jeong Ae Ahn, Daejeon (KR); Kyungmee Lee, Daejeon (KR); Yongjun Kim, Daejeon (KR); Nak Gi Sung, Daejeon (KR); Nak Hee Choi, Daejeon (KR)

(73) Assignee: LG Energy Solution, Ltd.

( * ) Notice: Subject to any disclaimer, the term of this patent is extended or adjusted under 35 U.S.C. 154(b) by 189 days.

(21) Appl. No.: 16/623,127

(22) PCT Filed: Oct. 24, 2018

(86) PCT No.: PCT/KR2018/012647
§ 371 (c)(1),
(2) Date: Dec. 16, 2019

(87) PCT Pub. No.: WO2019/083276
PCT Pub. Date: May 2, 2019

(65) Prior Publication Data
US 2020/0251705 A1    Aug. 6, 2020

(30) Foreign Application Priority Data

Oct. 26, 2017   (KR) ........................ 10-2017-0140207
Oct. 23, 2018   (KR) ........................ 10-2018-0126758

(51) Int. Cl.
*H01M 4/04*     (2006.01)
*H01M 50/30*    (2021.01)
(Continued)

(52) U.S. Cl.
CPC .............. *H01M 50/30* (2021.01); *G01N 7/14* (2013.01); *H01M 4/04* (2013.01); *G01L 19/0092* (2013.01)

(58) Field of Classification Search
CPC .......... H01M 50/30; H01M 4/04; G01N 7/14; G01L 19/0092
See application file for complete search history.

(56) References Cited

U.S. PATENT DOCUMENTS

2004/0134259 A1   7/2004  Haug et al.
2010/0112420 A1   5/2010  Back
(Continued)

FOREIGN PATENT DOCUMENTS

CN    1517689 A    8/2004
CN    101726388 A  6/2010
(Continued)

OTHER PUBLICATIONS

JP 6190783MT (Year: 2017).*
(Continued)

*Primary Examiner* — Alexander Usyatinsky
(74) *Attorney, Agent, or Firm* — Lerner, David, Littenberg, Krumholz & Mentlik, LLP (57) ABSTRACT

The present invention relates to a component for measuring a pressure change in a pouch-type battery, and a method for measuring a pressure change in a pouch-type battery by using the same and, particularly, to: a component connectable to pressure gauge by being mounted in a pouch-type battery for measuring a pressure change in the pouch-type battery; and a method for measuring a pressure change in a pouch-type battery by using the same.

10 Claims, 4 Drawing Sheets

(51) Int. Cl.
*G01N 7/14* (2006.01)
*G01L 19/00* (2006.01)

(56) References Cited

U.S. PATENT DOCUMENTS

| | | | | |
|---|---|---|---|---|
| 2013/0093398 A1* | 4/2013 | Takabayashi | ....... | H01M 50/124 |
| | | | | 429/185 |
| 2014/0023887 A1* | 1/2014 | Lim | ................... | H01M 10/482 |
| | | | | 429/61 |
| 2015/0349386 A1 | 12/2015 | Tsukui | | |
| 2017/0324120 A1 | 11/2017 | Pantel et al. | | |

FOREIGN PATENT DOCUMENTS

| | | | |
|---|---|---|---|
| CN | 102324588 A | | 1/2012 |
| CN | 103123289 A | | 5/2013 |
| CN | 204011594 U | | 12/2014 |
| DE | 19645515 A1 | | 5/1998 |
| DE | 20008933 U1 | | 12/2000 |
| JP | H0727600 U | | 5/1995 |
| JP | H08082731 A | | 3/1996 |
| JP | H09193954 A | | 7/1997 |
| JP | 2002131147 A | | 5/2002 |
| JP | 2004315057 A | | 11/2004 |
| JP | 2005285503 A | | 10/2005 |
| JP | 3134729 U | | 8/2007 |
| JP | 2010038675 | * | 2/2010 |
| JP | 2010038675 A | | 2/2010 |
| JP | 2010047264 A | | 3/2010 |
| JP | 20113513 A | | 1/2011 |
| JP | 2012221773 A | | 11/2012 |
| JP | 2013089426 A | | 5/2013 |
| JP | 2013212872 A | | 10/2013 |
| JP | 5629317 B2 | | 11/2014 |
| JP | 2015069946 A | | 4/2015 |
| JP | 2016051683 A | | 4/2016 |
| JP | 2016122505 A | | 7/2016 |
| JP | 6190783 B2 | * | 8/2017 |
| JP | 6198130 B2 | * | 9/2017 |
| KR | 20100088927 A | | 8/2010 |
| KR | 101029518 B1 | | 4/2011 |
| KR | 20120108677 A | | 10/2012 |
| KR | 101660443 B1 | | 9/2016 |
| KR | 20170041103 A | | 4/2017 |
| KR | 20170084789 A | | 7/2017 |
| WO | 2016074844 A1 | | 5/2016 |

OTHER PUBLICATIONS

JP 6198130 (Year: 2017).*
JP2010038675MT (Year: 2010).*
The decision of EPO to grant a Patent to Application No. EP.18871488.A (Year: 2022).*
The decision of KPO to grant a Patent to Application No. KR.20180126758.A (Year: 2020).*
International Search Report from Application No. PCT/KR2018/012647 dated Jan. 28, 2019, 2 pages.
Prior Art Search Report for Application No. 2017-2252KR A dated Aug. 7, 2017, 1 page.
Prior Art Search Report for Application No. 2017-2252KR S dated Jun. 21, 2018, 1 page.

* cited by examiner

Using rubber pad sealing member

COMPONENT FOR MEASURING PRESSURE CHANGE IN POUCH-TYPE BATTERY, AND METHOD FOR MEASURING PRESSURE CHANGE IN POUCH-TYPE BATTERY BY USING SAME

CROSS-REFERENCE TO RELATED APPLICATIONS

The present application is a national phase entry under 35 U.S.C. § 371 of International Patent Application No. PCT/KR2018/012647, filed on Oct. 24, 2018, published in Korean, which claims priority from Korean Patent Application No. 10-2017-0140207, filed on Oct. 26, 2017, and Korean Patent Application No. 10-2018-0126758, filed on Oct. 23, 2018, the disclosures of which are hereby incorporated herein by reference in their entireties.

TECHNICAL FIELD

The present invention relates to a component for measuring pressure change of a pouch type battery and a method for measuring pressure change of a pouch type battery using same. Specifically, it relates to a component which can be installed on a pouch type battery and connected to a pressure gauge for measuring pressure change of a pouch type battery.

BACKGROUND ART

In general, in order to measure pressure change of a battery, the battery is put in a box of a certain size, and let the inside of the box become vacuum. Then, the pressure change is checked by drilling a hole in the pouch side of the battery and measured by collecting the inner gas. Since this method is a method of measuring the pressure change by collecting the inner gas in a vacuum state, dissolved gas is also vaporized and it is difficult to know the actual pressure change inside the battery, and there is a problem that an electrolyte is vaporized from the battery due to the vacuum state inside the box.

DISCLOSURE

Technical Problem

As a different method from the conventional techniques, it is necessary to develop a method that can measure pressure change inside a battery cell while evaluating the characteristics of the battery cell such as lifetime and storage from the initial stage of forming the battery cell by installing the component for measuring pressure change of a pouch type battery in the initial cell assembly process of the pouch type battery, and it is necessary to develop a method that can also collect samples for gas analysis while measuring pressure change.

Technical Solution

The component for measuring pressure change of a pouch type battery according to the present invention may comprise:

a connecting pipe having a tubular shape, the connecting pipe configured to be located outside of an exterior layer of the pouch type battery, is the connecting pipe defining a passage through which an interior of the pouch type battery and a pressure gauge can be directly or indirectly connected;

a first fixing unit having a tubular shape, the first fixing unit being connected to a lower end facing the pouch type battery of the both ends of the connecting pipe, the first fixing unit configured to extend through an opening formed in the exterior material of the pouch type battery, wherein an upper end of the first fixing unit is closed connected to the lower end of the connecting pipe and a lower end of the first fixing unit is open;

a second fixing unit having a tubular shape, the second fixing unit being connected to the first fixing unit and configured to be located inside the pouch type battery under the exterior layer of the pouch type battery, wherein an upper end of the second fixing unit is connected to the lower end of the first fixing unit, and a lower end of the second fixing unit is open; and a third fixing unit surrounding an outer surface of the first fixing unit, wherein an upper side of the third fixing unit defining an opening through which the first fixing unit extends, wherein an inner surface of the third fixing unit is coupled to the outer surface of the first fixing unit, and a lower end of the third fixing unit confronts the upper end of the second fixing unit, the lower end of the third fixing unit configured to be coupled to the upper end of the second fixing unit through the exterior layer of the pouch type battery.

Further, in the component for measuring pressure change of a pouch type battery according to the present invention, the connecting pipe, the first fixing unit and the second fixing unit may together form a single unitary body.

Further, the component for measuring pressure change of a pouch type battery according to the present invention may further comprise a valve coupled to the upper end of the connecting pipe, the valve configured to couple the connecting pipe to a pressure gauge opening and closing of the connecting pipe.

Further, the component for measuring pressure change of a pouch type battery according to the present invention can be installed in the exterior layer of the pouch type battery at the initial stage of manufacturing the pouch type battery.

Further, the component for measuring pressure change of a pouch type battery according to the present invention may further comprise:

an elastic first sealing member which can be installed on the inner surface of the third fixing unit; and an elastic second sealing member which can be installed on the upper end of the second fixing unit, wherein when the third fixing unit is coupled to the second fixing unit, through the exterior layer of the pouch type battery, the first sealing member and the second sealing member are disposed close to each other at opposite surfaces of the exterior layer of the pouch type battery.

Further, in the component for measuring pressure change of a pouch type battery according to the present invention, the first sealing member may conform to a shape of a horizontal portion of the lower end of the third fixing unit.

Further, in the component for measuring pressure change of a pouch type battery according to the present invention, a shape of the second sealing member may be the same as a shape of the first sealing member.

Further, in the component for measuring pressure change of a pouch type battery according to the present invention, a size of a horizontal cross section of the first fixing unit may be larger than a size of a horizontal cross section of the connecting pipe, and a size of a horizontal cross section of the second fixing unit may be larger than the size of the horizontal cross section of the first fixing unit.

Further, in the component for measuring pressure change of a pouch type battery according to the present invention, the connecting pipe, the first fixing unit and the second fixing unit may be each comprised of plastic, the third fixing unit may be comprised of plastic or metal, and the first sealing member and the second sealing member may be each comprised of rubber or latex.

Further, in the component for measuring pressure change of a pouch type battery according to the present invention, the connecting pipe, the first fixing unit and the second fixing unit may be each comprised of at least one selected from the group consisting of polyethylene (PE), polypropylene (PP), Teflon and PEEK, respectively, the third fixing unit may be comprised of at least one selected from the group consisting of stainless steel (SUS), aluminum (Al), polyethylene (PE), polypropylene (PP), Teflon and PEEK, and the first sealing member and the second sealing member may be each comprised of at least one selected from the group consisting of rubber, latex, polybutadiene rubber (BR), nitrile butadiene rubber (NBR), ethylene-propylene rubber (EPM, EPDM) and silicon rubber (VMQ).

Further, in the pouch type battery with the component for measuring pressure change of a pouch type battery according to the present invention, the first fixing unit may extend through the opening formed in the exterior layer of the pouch type battery.

Further, the method for measuring pressure change of gas generated from the pouch type battery according to the present invention may comprise the following steps of:

A. installing the component for measuring pressure change of a pouch type battery onto the exterior layer of the pouch type battery;

B. injecting an electrolyte into the pouch type battery, thermally fusing edges of an upper side and a lower side of the exterior layer of the pouch type battery to form a single unitary body, and activating the pouch type battery to manufacture a pouch type battery having the desired characteristics; and C. during or after the step B, connecting a pressure gauge to the connecting pipe of the component for measuring pressure change of a pouch type battery and measuring the pressure change of the gas generated in the pouch type battery under the desired experimental conditions.

Advantageous Effects

According to the present invention, there are advantages of measuring pressure change inside a battery cell while evaluating the characteristics of the battery cell such as lifetime and storage from the initial stage of forming the battery cell by installing the component for measuring pressure change of a pouch type battery in the initial cell assembly process of the pouch type battery, and of collecting samples for gas analysis while measuring pressure change.

BEST MODE CARRYING OUT THE INVENTION

The component for measuring pressure change of a pouch type battery according to the present invention may comprise:

a connecting pipe having a tubular shape, the connecting pipe configured to be located outside of an exterior layer of the pouch type battery, the connecting pipe defining a passage through which an interior of the pouch type battery and a pressure gauge can be directly or indirectly connected;

a first fixing unit having a tubular shape, the first fixing unit being connected to a lower end of the connecting pipe, the first fixing unit configured to extend through an opening formed in the exterior layer of the pouch type battery, wherein an upper end of the first fixing unit is connected to the lower end of connecting pipe and a lower end of the first fixing unit is open;

a second fixing unit having a tubular shape, the second fixing unit being connected to the first fixing unit and configured to be located inside the pouch type battery under the exterior layer of the pouch type battery, wherein an upper end of the second fixing unit is connected to the lower end of the first fixing unit, and a lower end of the second fixing unit is open; and a third fixing unit surrounding an outer surface of the first fixing unit, the third fixing unit defining an opening through which the first fixing unit extends, wherein an inner surface of the third fixing unit can be coupled to the outer surface of the first fixing unit, and a lower end of the third fixing unit confronts the upper end of the second fixing unit, the lower end of the third fixing unit configured to be coupled to the upper end of the second fixing unit through the exterior layer of the pouch type battery.

Further, in the component for measuring pressure change of a pouch type battery according to the present invention, the connecting pipe, the first fixing unit and the second fixing unit may together form a single unitary body.

Further, the component for measuring pressure change of a pouch type battery according to the present invention may further comprise a valve coupled to the upper end of the connecting pipe, the valve configured to couple the connecting pipe to a pressure gauge, the valve configured to control opening and closing of the connecting pipe.

Further, the component for measuring pressure change of a pouch type battery according to the present invention can be configured to be installed in the opening formed in the exterior layer of the pouch type battery during an initial stage of manufacturing the pouch type battery.

Further, the component for measuring pressure change of a pouch type battery according to the present invention may further comprise:

an elastic first sealing member installed on the lower end of the third fixing unit; and an elastic second sealing member installed on the upper end of the second fixing unit, wherein when the third fixing unit is coupled to the second fixing unit through the exterior layer of the pouch type battery, the first sealing member and the second sealing member may be disposed close to each other at opposite surfaced of the exterior layer of the pouch type battery.

Further, in the component for measuring pressure change of a pouch type battery according to the present invention, the first sealing member may conforms to a shape of a horizontal portion of the lower end of the third fixing unit.

Further, in the component for measuring pressure change of a pouch type battery according to the present invention, a shape of the second sealing member may be the same as a shape of the first sealing member.

Further, in the component for measuring pressure change of a pouch type battery according to the present invention, a size of a horizontal cross section of the first fixing unit may be larger than a size of a horizontal cross section of the connecting pipe, and a size of a horizontal cross section of the second fixing unit may be larger than the size of the horizontal cross section of the first fixing unit.

Further, in the component for measuring pressure change of a pouch type battery according to the present invention, the connecting pipe, the first fixing unit and the second fixing unit may be each comprised of plastic, the third fixing unit may be comprised of plastic or metal, and the first sealing member and the second sealing member may be each comprised of rubber or latex.

Further, in the component for measuring pressure change of a pouch type battery according to the present invention, the connecting pipe, the first fixing unit and the second fixing unit may be each comprised of at least one selected from the group consisting of polyethylene (PE), polypropylene (PP), Teflon and PEEK, the third fixing unit may be comprised of at least one selected from the group consisting of stainless steel (SUS), aluminum (Al), polyethylene (PE), polypropylene (PP), Teflon and PEEK, and the first sealing member and the second sealing member may be each comprised of at least one selected from the group consisting of rubber, latex, polybutadiene rubber (BR), nitrile butadiene rubber (NBR), ethylene-propylene rubber (EPM, EPDM) and silicon rubber (VMQ).

Further, in the pouch type battery with the component for measuring pressure change of a pouch type battery according to the present invention, the first fixing unit extends through the opening formed in the exterior layer of the pouch type battery.

Further, the method for measuring pressure change of a gas generated in the pouch type battery according to the present invention may comprise the following steps of:

A. installing the component for measuring pressure change of a pouch type battery onto the exterior layer of the pouch type battery;

B. injecting an electrolyte into the pouch type battery, thermally fusing edges of an upper side and a lower side of the exterior layer of the pouch type battery to form a single unitary body, and activating the pouch type battery to manufacture a pouch type battery having the desired characteristics; and C. during or after the step B, connecting a pressure gauge to the connecting pipe of the component for measuring pressure change of a pouch type battery and measuring the pressure change under the desired experimental conditions.

MODE FOR INVENTION

Hereinafter, a component for measuring pressure change of a pouch type battery according to the present invention and a method for measuring pressure change of a pouch type battery using the same will be explained in detail. The accompanying drawings are provided for illustration only and should not be construed as limiting the scope of the invention.

In addition, the same or corresponding components are given by the same or similar reference numerals, regardless of the reference numerals in the drawings, for which the repeated explanation will be omitted, and for convenience of description, the size and shape of each illustrated structural member may be exaggerated or downsized.

Figure 1:
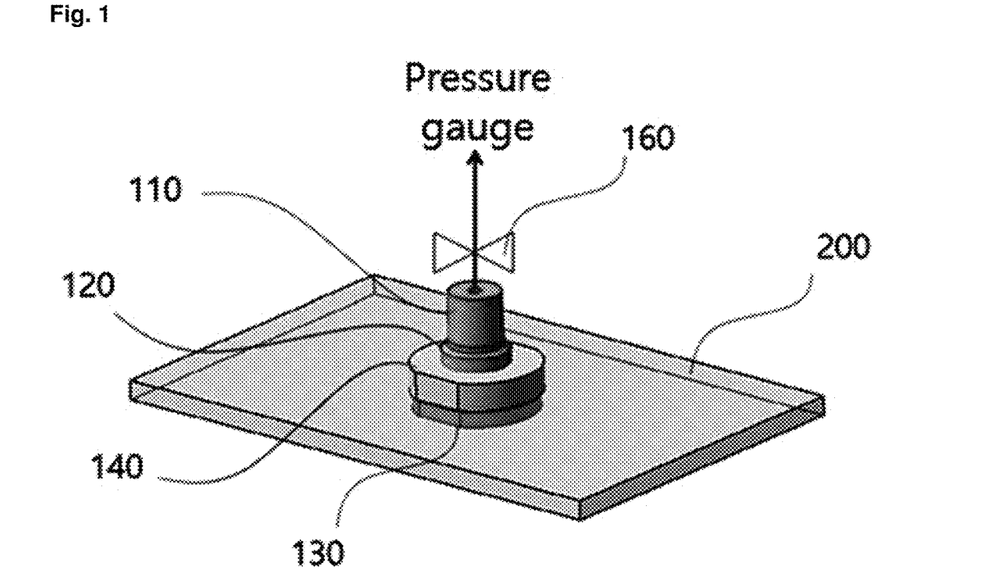
FIG. 1 illustrates a case that the component for measuring pressure change of a pouch type battery according to the present invention is installed on a pouch type battery.
Figure 2:
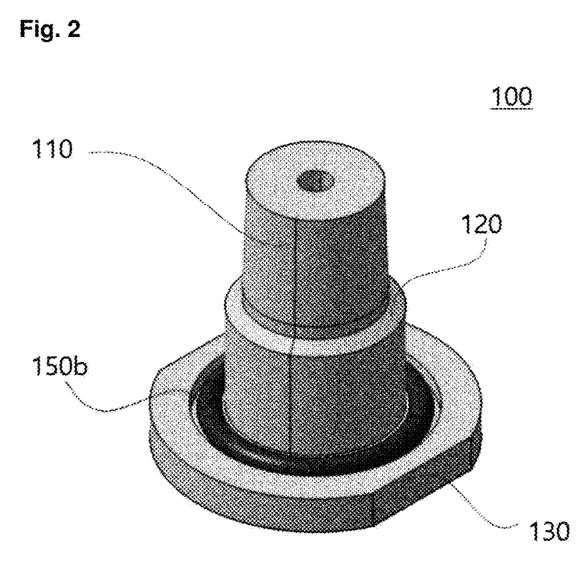
FIG. 2 and FIG. 3 are a perspective view and a front view of the component for measuring pressure change of a pouch type battery of FIG. 1, respectively.
Figure 3:
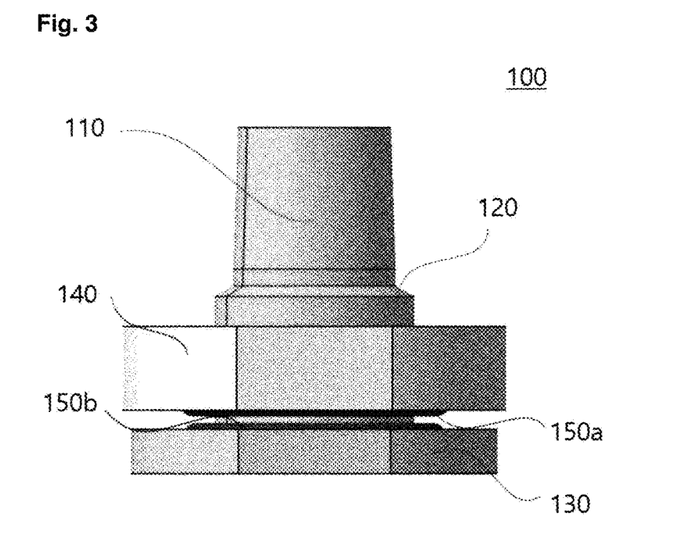

FIG. 1 illustrates a case that the component for measuring pressure change of a pouch type battery according to the present invention 100 is installed on a pouch type battery 200. FIG. 2 and FIG. 3 are a perspective view and a front view of the component for measuring pressure change of a pouch type battery 100 of FIG. 1, respectively.

First, FIG. 1 illustrates the component for measuring pressure change of a pouch type battery 100 installed on the pouch type battery 200. The component for measuring pressure change of a pouch type battery 100 can be installed on the exterior layer of the pouch type battery 200, for example, from the initial cell assembly process of the pouch type battery 200. In one embodiment, as shown in FIG. 1, the component for measuring pressure change of a pouch type battery 100 can be installed on the upper face of the exterior layer of the pouch type battery 200, but if the size of the pouch type battery 200 is small or the installation of the component for measuring pressure change of a pouch type battery 100 is difficult in the initial assembly stage of the pouch type battery 200, various modifications are possible, for examples, the component may not be installed on the upper face of the exterior layer or may be installed in a gas pocket of the pouch type battery 200.

A pressure gauge (not shown) for measuring pressure change of the pouch type battery can be directly or indirectly connected to the component for measuring pressure change of a pouch type battery 100 installed on the exterior layer of the pouch type battery 200. Conventionally, the method of inserting the battery into a box and drilling a hole in the battery to diffuse gas into the box and collect it has problems that the accuracy of pressure measurement is lowered and the accuracy of pressure measurement is further lowered as an electrolyte of the battery is vaporized into the vacuum box. However, in the present invention, by using a novel method of installing the component for measuring pressure change of a pouch type battery 100 on the exterior layer of the pouch type battery 200, the gas generated from the pouch type battery 200 is directly transferred to the pressure gauge so that pressure of the gas generated in the battery 200 can be accurately measured. Further, by using the component for measuring pressure change of a pouch type battery 100, sampling for analyzing the gas generated in the battery 200 is also made easy.

FIG. 2 illustrates some components of the component for measuring pressure change of a pouch type battery 100 according to FIG. 1. The component for measuring pressure change of a pouch type battery 100 comprises a connecting pipe 110 that is a passage capable of connecting the pouch type battery 200 and the pressure gauge. The connecting pipe 110 is located on the exterior layer of the pouch type battery 200 and has a tubular shape having a predetermined length. Accordingly, a pipe or a tube (not shown) capable of transferring the gas generated from the pouch type battery 200 to the pressure gauge can be installed on the connecting pipe 110. Or, in some cases, the pressure gauge can be directly connected to the connecting pipe 110. In order to reduce the dead volume, the length of the connecting pipe 110 is preferably as short as possible within a range in which the pipe or the tube (not shown) capable of transferring gas to the pressure gauge can be easily installed on the connecting pipe 110. For example, the length may be 0.1 cm to 5 cm, or 0.5 cm to 3 cm. The overall height of the component for measuring pressure change of a pouch type battery 100 (i.e., the total length including the connecting pipe 110, the first fixing unit 120, the second fixing unit 130 and a valve 160 to be described later) may be, for example, 1 cm to 10 cm, or 1.5 cm to 5 cm.

One end facing the pressure gauge of the both ends of the connecting pipe 110 may further include a valve 160 capable of controlling opening and closing of the connecting pipe 110. The valve 160 may be a valve capable of on/off, that is, opening and closing of the connecting pipe 110, and for example, it may be a ball valve, a butterfly valve, a gate valve, a diaphragm valve and a globe valve. The first fixing unit 120 is connected to the other end of the connecting pipe 110 facing the pouch type battery 200 of the both ends.

The first fixing unit 120 is integrally formed with the connecting pipe 110, and is located on the exterior layer of the pouch type battery 200. In one embodiment of the present invention, as shown in FIG. 2, the first fixing unit 120 may be a tubular shape having a circular horizontal section. The upper side of the first fixing unit 120 is closed but the part connected to the connecting pipe 110 is open. The size of the horizontal section of the first fixing unit 120 may be larger than the horizontal section of the connecting pipe 110. The third fixing unit 140 (see FIG. 3) is combined to the first fixing unit 120 to prevent the component for measuring pressure change of a pouch type battery 100 from being detached from the pouch type battery 200. In one embodiment, the third fixing unit 140 may be in the form of a cap that covers the upper side and the side of the first fixing unit 120, and the upper side of the third fixing unit 140 may have an opening through which the connecting pipe 110 can pass. In one embodiment, the side of the outer surface of the first fixing unit 120 has a male screw shape and the side of the inner surface of the third fixing unit 140 has a female screw shape so that the male screw shape of the first fixing unit 120 and the female screw shape of the third fixing unit 140 can be geared with each other for combination. Or, on the contrary, the female screw shape of the first fixing unit 120 and the male screw shape of the third fixing unit 140 can be geared with each other for combination. Or, the side of the outer surface of the first fixing unit 120 and the side of the inner surface of the third fixing unit 140 are respectively provided with protrusions and recesses so that the protrusions and the recesses may be geared with each other for combination. The combination method of the first fixing unit 120 and the third fixing unit 140 is not limited to the above description, and various modifications and variations are possible.

The connecting pipe 110 is connected to the upper side of the first fixing unit 120 to form a single unitary body, and the second fixing unit 130 is connected to the lower side of the first fixing unit 120 to form a single unitary body. In one embodiment, as shown in FIG. 2, the second fixing unit 130 may be a tubular shape having a circular horizontal section. The upper side of the second fixing unit 130 is closed but the part connected to the first fixing unit 120 is open. The second fixing unit 130 is located under the exterior layer of the pouch type battery 200, that is, inside the pouch type battery 200. When manufacturing the pouch type battery 200, in the initial stage of the manufacture, an opening is formed in the exterior layer of the pouch type battery 200 so as to substantially correspond to the shape of the horizontal section of the first fixing unit 120, and then a member integrally formed with the connecting pipe 110, the first fixing unit 120 and the second fixing unit 130 is installed on the opening of the exterior layer of the pouch type battery 200. Accordingly, the connecting pipe 110 and the first fixing unit 120 are located on the exterior layer of the pouch type battery 200 (i.e., outside of the pouch type battery 200), and the second fixing unit 130 is located under the exterior layer of the pouch type battery 200 (i.e., inside the pouch type battery 200). The size of the horizontal section of the second fixing unit 130 may be larger than the horizontal section of the first fixing unit 120. Accordingly, when the third fixing unit 140 is combined to the first fixing unit 120, the lower end of the third fixing unit 140 contacts the second fixing unit 130 through the exterior layer of the pouch type battery 200. Thus, detachment of the component for measuring pressure change of a pouch type battery 100 from the pouch type battery 200 can be prevented.

The inner surface of the third fixing unit 140 is provided with the first sealing member 150a, which has elasticity and the shape corresponding to the shape of the horizontal section of the inner surface of the third fixing unit 140, such as a pad shape (see FIG. 4) and a ring shape. Further, the second sealing member 150b, which has the same or similar shape with the shape of the first sealing member 150a and also has elasticity, can be installed on the upper side of the second fixing unit 130. Accordingly, when the third fixing unit 140 is combined to the first fixing unit 120 and the second fixing unit 130, the first sealing member 150a and the second sealing member 150b are brought into close contact with each other through the exterior layer of the pouch type battery 200 to prevent the gas generated from the pouch type battery 200 from leaking to the outside. Further, it is possible to prevent the exterior layer of the pouch type battery 200 from tearing due to friction with the third fixing unit 140 or the second fixing unit 130.

The connecting pipe 110, the first fixing unit 120 and the second fixing unit 130, which are in contact with the electrode surface of the pouch type battery 200, may be made of a plastic material and the like so as to prevent short, and for example, the material may be at least one plastic selected from the group consisting of polyethylene (PE), polypropylene (PP), Teflon and PEEK. The third fixing unit 140, which is located outside the pouch type battery 200, can be made of plastics, metals and the like. For example, the material may be at least one selected from the group consisting of metals such as stainless steel (SUS) and aluminum (Al) and plastics such as polyethylene (PE), polypropylene (PP), Teflon and PEEK. The first sealing member 150a and the second sealing member 150b may be made of a material having elasticity and not soluble in the electrolyte component such as rubber and latex. For example, the material may be at least one selected from the group consisting of rubber, latex, polybutadiene rubber (BR), nitrile butadiene rubber (NBR), ethylene-propylene rubber (EPM, EPDM) and silicon rubber (VMQ).

FIG. 3 illustrates the third fixing unit 140 combined to the first fixing unit 120 and the second fixing unit 130 in the component for measuring pressure change of a pouch type battery 100 according to FIG. 1. The pouch type battery 200 is not shown in FIG. 3, but as shown in FIG. 1, when the component for measuring pressure change of a pouch type battery 100 is installed on the pouch type battery 200, the exterior layer of the pouch type battery 200 may be located between the lower end of the third fixing unit 140 and the upper side of the second fixing unit 130.

Figure 4:
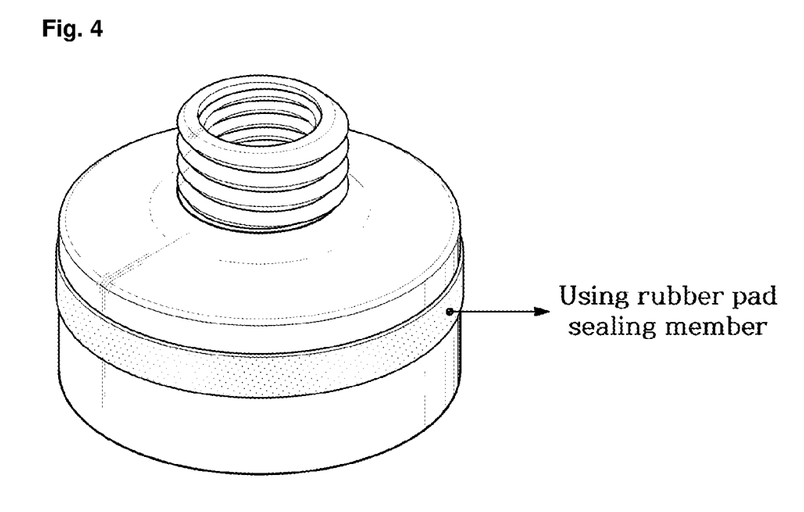
FIG. 4 is an exemplary photograph of a rubber pad used as a sealing member in the component for measuring pressure change of a pouch type battery of FIG. 1.

FIG. 4 shows an exemplary photograph of a rubber pad used as the first and the second sealing members 150a, 150b in the component for measuring pressure change of a pouch type battery of FIG. 1.

Hereinafter, the method for measuring pressure change of the gas generated inside the pouch type battery 200 will be described using the component for measuring pressure change of a pouch type battery 100 according to one embodiment of the present invention.

First, the component for measuring pressure change of a pouch type battery 100 is installed on the exterior layer of the pouch type battery 200 (Step 1). In one embodiment, as shown in FIG. 1, the component for measuring pressure change of a pouch type battery 100 may be installed on the upper surface of the exterior layer of the pouch type battery 200, but if the size of the pouch type battery 200 is small or it is difficult to install the component for measuring pressure change of a pouch type battery 100 in the initial assembly stage of the pouch type battery 200, the component may not be installed on the upper surface of the exterior layer. Namely, in the present invention, the component for measuring pressure change of a pouch type battery 100 can be located on the upper surface of the pouch type battery 200, but not limited to that shown in FIG. 1. For example, the component can be installed on a gas pocket of the pouch type battery 200 and various modifications and variations are possible.

Then, an electrolyte is injected into the opening part of the gas pocket of the pouch type battery 200 on which the component for measuring pressure change of a pouch type battery 100 is installed, edges of the upper side and the lower side of the exterior layer of the pouch type battery 200 are thermally fused to form a single unitary body, and then activation is proceeded to manufacture the pouch type battery 200 having the desired characteristics (Step 2). To additionally explain about the activation, after injecting the electrolyte to drive the pouch type battery, a certain period of time is waited for the electrolyte to be wetted to the electrode, and then a voltage is slowly applied to form a passage through which lithium (Li) ions are transferred from the positive electrode to the negative electrode. In summary, in the step 2, the pouch type battery 200 on which the component for measuring pressure change of a pouch type battery 100 is installed is manufactured by the conventional method of manufacturing a pouch type battery.

During the step 2 or after the step 2, the pressure gauge is connected to the connecting unit 110 of the component for measuring pressure change of a pouch type battery 100 to measure pressure change under the desired experimental conditions (Step 3). Namely, after the activation of the pouch type battery 200 in the step 2, the gas generated inside the pouch type battery 200 can be collected through the component for measuring pressure change of a pouch type battery 100 to measure pressure change, and also during the activation of the pouch type battery 200 in the step 2, the gas generated during the activation of the pouch type battery 200 can be collected through the component for measuring pressure change of a pouch type battery 100 to measure pressure change. The desired experimental conditions may be, for example, 45° C., 60° C., 85° C. in a state where the state of charge (SOC) is 100%.

Example

First, Table 1 shows the results of calculating the total internal pressure in the cell when pressure change of the pouch type battery 200 was measured using the component for measuring pressure change of a pouch type battery 100 according to FIG. 1 at a temperature of 60° C. and a 4.25 V SOC 100% charged state during the storage period of three weeks.

TABLE 1

| (Storage period: 3 weeks) | CO | $CO_2$ | Other gas | Electrolyte | Total internal pressure |
|---|---|---|---|---|---|
| Measured pressure value (bar) | 0.61 | 1.03 | 0.34 | 0.13 | 2.1 |

In Table 1, the gas generated from the battery (CO, $CO_2$, other gas) was measured using the component for measuring pressure change of a pouch type battery 100. In the case of vapor pressure of the electrolyte, since the pressure at the equilibrium is the same even if the volume of the diffusion space is different, the electrolyte of the same composition used in the battery was diffused in a certain space to measure the vapor pressure in the same manner as in the prior art, and then the total internal pressure in the cell was calculated by summing the above values.

In Comparative Example, as described above in the prior art for measuring pressure change of a pouch type battery, a cell of the same sample was placed in a jig and diffused into a diffusion space, and then pressure change was measured with a pressure sensor under the same conditions. In Comparative Example, the total internal pressure was about 1.5 bar.

Table 2 below shows the total internal pressure value when pressure change of the pouch type battery 200 was measured using the component for measuring pressure change of a pouch type battery 100 according to FIG. 1 at a temperature of 60° C. during the storage period of three weeks and the total internal pressure value when pressure change of the pouch type battery 200 was measured according to the method of Comparative Example under the same conditions.

TABLE 2

| (Storage period: 3 weeks) | Present invention | Comparative Example |
|---|---|---|
| Measured pressure value (bar) | 2.1 | 1.5 |

It should be understood that those skilled in the art can carry out other modifications without changing its technical spirit or essential features. Therefore, the above-described embodiment of the present invention is merely exemplary in all aspects and should not be construed to be limited, and it should be understood that the scope of the present invention is defined by the following claims and the meanings and ranges of the claims and all modifications and changed forms derived from their equivalents pertain to the scope of the present invention.

DESCRIPTION OF SYMBOLS

100: Component for measuring pressure change of a pouch type battery
110: Connecting pipe
120: First fixing unit
130: Second fixing unit
140: Third fixing unit
150a: First sealing member
150b: Second sealing member
160: Valve
200: Pouch type battery

The invention claimed is:

1. A pouch type battery comprising a component for measuring pressure change of the pouch type battery, the component comprising:
   a connecting pipe having a tubular shape, the connecting pipe configured to be located outside of an exterior layer of the pouch type battery, the connecting pipe defining a passage through which an interior of the pouch type battery and a pressure gauge can be directly or indirectly connected;
   a first fixing unit having a tubular shape, the first fixing unit being connected to a lower end of the connecting pipe, the first fixing unit extending through an opening formed in the exterior layer of the pouch type battery, wherein an upper end of the first fixing unit is connected to the lower end of the connecting pipe and a lower end of the first fixing unit is open;
   a second fixing unit having a tubular shape, the second fixing unit being connected to the first fixing unit and located inside the pouch type battery under the exterior layer of the pouch type battery, wherein an upper end of the second fixing unit is connected to the lower end of the first fixing unit, and a lower end of the second fixing unit is open;
   a third fixing unit surrounding an outer surface of the first fixing unit, the third fixing unit defining an opening through which the first fixing unit extends;
   an elastic first sealing member installed on the lower end of the third fixing unit; and
   an elastic second sealing member installed on the upper end of the second fixing unit,
   wherein when the third fixing unit is coupled to the second fixing unit through the exterior layer of the pouch type battery, the first sealing member and the second sealing member are in contact with each other through the exterior layer of the pouch type battery, the first sealing member and the second sealing member abutting opposite surfaces of the exterior layer of the pouch type battery,
   wherein an inner surface of the third fixing unit is coupled to the outer surface of the first fixing unit, and a lower end of the third fixing unit confronts the upper end of the second fixing unit, the lower end of the third fixing unit configured to be coupled to the upper end of the second fixing unit through the exterior layer of the pouch type battery, and
   wherein the connecting pipe, the first fixing unit and the second fixing unit, which are in contact with an electrode surface of the pouch type battery, are made of at least one selected from the group consisting of: polyethylene (PE), polypropylene (PP), Teflon, and PEEK, thereby preventing a short.

2. The pouch type battery according to claim 1, wherein the connecting pipe, the first fixing unit, and the second fixing unit together form a single unitary body.

3. The pouch type battery according to claim 1, further comprising a valve coupled to an upper end of the connecting pipe, the valve configured to couple the connecting pipe to a pressure gauge, the valve configured to control opening and closing of the connecting pipe.

4. The pouch type battery according to claim 1, wherein the component is configured to be installed in the opening formed in the exterior layer of the pouch type battery during an initial stage of manufacturing the pouch type battery.

5. The pouch type battery according to claim 1, wherein the first sealing member conforms to a shape of a horizontal portion of the lower end of the third fixing unit.

6. The pouch type battery according to claim 5, wherein a shape of the second sealing member is the same as a shape of the first sealing member.

7. The pouch type battery according to claim 1, wherein a size of a horizontal cross section of the first fixing unit is larger than a size of a horizontal cross section of the connecting pipe, and a size of a horizontal cross section of the second fixing unit is larger than the size of the horizontal cross section of the first fixing unit.

8. The pouch type battery according to claim 1, wherein the third fixing unit is comprised of plastic or metal, and the first sealing member and the second sealing member are each comprised of rubber or latex.

9. The pouch type battery according to claim 8, wherein the third fixing unit is comprised of at least one selected from the group consisting of: stainless steel (SUS), aluminum (Al), polyethylene (PE), polypropylene (PP), Teflon and PEEK, and
   the first sealing member and the second sealing member are each comprised of at least one selected from the group consisting of: rubber, latex, polybutadiene rubber (BR), nitrile butadiene rubber (NBR), ethylene-propylene rubber (EPM, EPDM) and silicon rubber (VMQ).

10. A method for measuring a pressure change of a gas generated in the pouch type battery according to claim 1, the method comprising:
    (A) installing the component onto the exterior layer of the pouch type battery;
    (B) injecting an electrolyte into the pouch type battery, thermally fusing edges of an upper side and a lower side of the exterior layer of the pouch type battery to form a single unitary body, and then activating the pouch type battery by applying a voltage to an electrode of the pouch type battery; and
    (C) during or after step B, connecting a pressure gauge to the connecting pipe of the component and measuring the pressure change of the gas generated in the pouch type battery.

* * * * *